April 29, 1969 MIYAJI TOMOTA ET AL 3,441,821
DRIVING DEVICE FOR STEP MOTORS
Filed Dec. 27, 1966
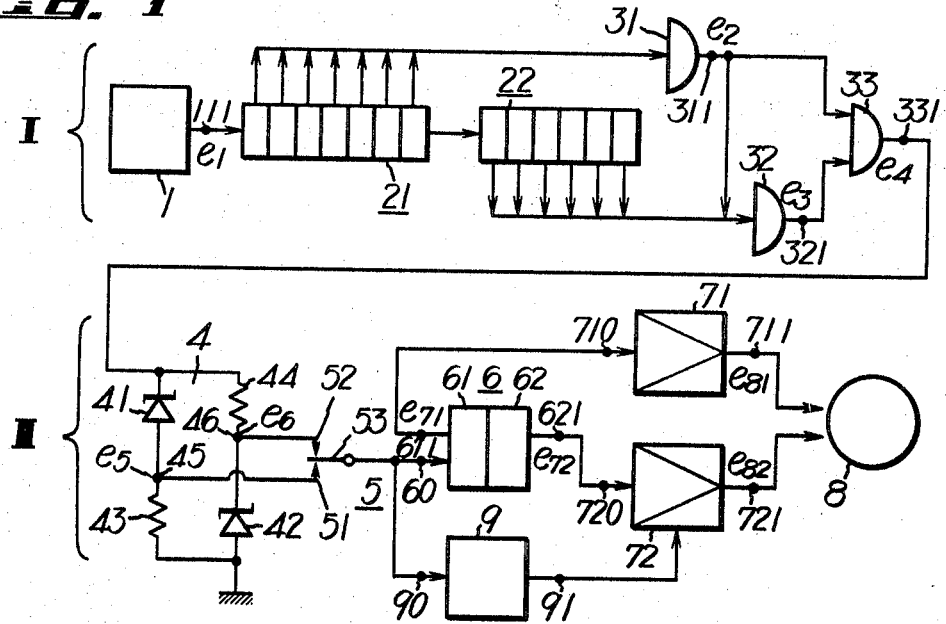
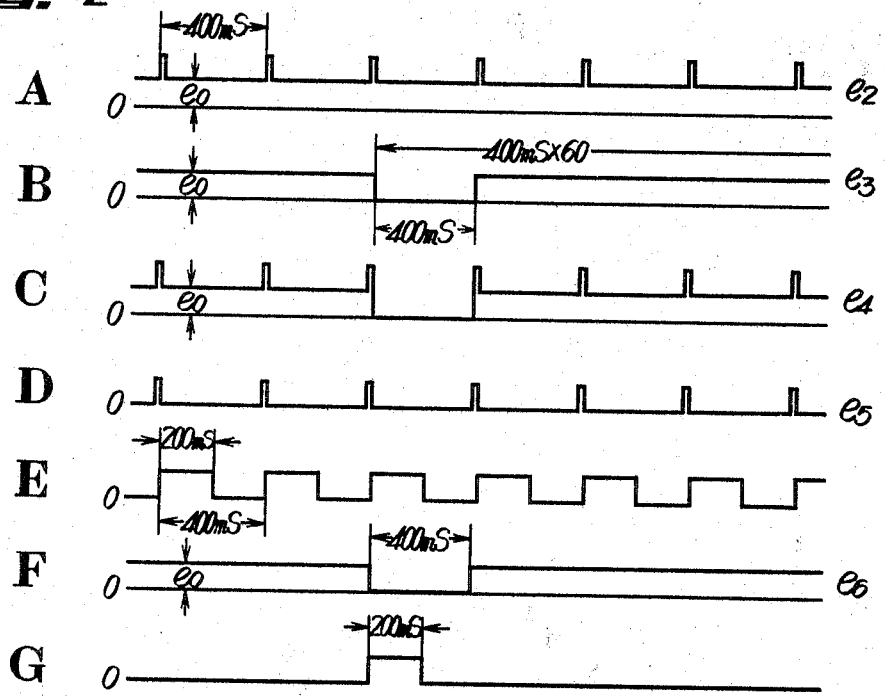
INVENTORS
Miyaji Tomota
Bunjiro Saito
BY Hill, Sherman, Meroni, Gross & Simpson ATTORNEYS

United States Patent Office 3,441,821
Patented Apr. 29, 1969

3,441,821
DRIVING DEVICE FOR STEP MOTORS
Miyaji Tomota and Bunjiro Saito, Tokyo, Japan, assignors to Kabushikikaisha Yokogawa Denki Seisakusho (Yokogawa Electric Works Ltd.), Tokyo, Japan, a corporation of Japan
Filed Dec. 27, 1966, Ser. No. 604,915
Claims priority, application Japan, Jan. 18, 1966, 41/2,737
Int. Cl. H02k 29/00
U.S. Cl. 318—138           2 Claims This invention relates to a driving device for step motors, and more particularly to a driving device adapted to drive step motors at various speeds.

One object of this invention is to provide an improved driving device for step motors in which an output signal emanating from a reference pulse generator at a certain frequency is converted into pulse signals of more than two kinds of frequencies and the step motor is driven step by step by the resulting pulse signals.

Another object of this invention is to provide a driving device for step motors in which control pulses of various frequencies are fed through a single transmission line to the step motor to drive it.

Still another object of this invention is to provide a driving device for step motors in which the time for supply of a driving current to the step motor is limited so as to ensure reduction of power consumption.

Other objects, features and advantages of this invention will become apparent from the following description taken in conjunction with the accompanying drawings, in which:

FIGURE 1 is a block diagram illustrating one example of this invention; and

FIFURE 2 is a series of waveform diagrams for explaining the example depicted in FIGURE 1.

In FIGURE 1 reference numeral I indicates generally a pulse generator circuit for obtaining a pulse signal produced by superposing more than two kinds of pulse signals, II a driving circuit which receives the output pulse signal of the pulse generator circuit and drives a step motor at more than two kinds of revolving speeds. In the pulse generator circuit I reference numeral 1 identifies a reference pulse generator such, for example, as a tuning fork oscillator or a crystal oscillator which generates a pulse voltage $e_1$ of a certain constant frequency, 21 a first frequency divider comprising, for example, a plurality of flip-flop circuits arranged in cascade connection and demultiplying the frequency of the output pulse voltage $e_1$ of the reference pulse generator 1 into a frequency of $1/n_1$ thereof, 22 a second frequency divider constructed in substantially the same manner as the first frequency divider 21 and demultiplying the frequency of the output pulse of the first frequency divider 21 into a frequency of $1/n_2$ thereof, 31 a first and-gate circuit having a plurality of input terminals each connected to the output end of the flip-flop circuit of each stage of the first frequency divider, 32 a second and-gate circuit having a plurality of input terminals each connected to the output end of the flip-flop circuit of each stage of the second frequency divider 22 and to the output terminal 311 of the first and-gate circuit 31, and 33 an or-gate circuit having input terminals connected to the output terminal 311 of the first and-gate circuit 31 and the output terminal 321 of the second and-gate circuit 32.

For convenience of describing this invention, in the illustrated example the pulse generator circuit 1 has an output frequency of 330 p.p.s. and the first frequency divider 21 has a frequency dividing ratio of 120 while the second frequency divider 22 has a frequency dividing ratio of 60, the two frequency dividers being adapted so that their output pulse voltage has a bias of a certain value. In this case a pulse voltage $e_2$ produced at the output terminal 311 of the first and-gate circuit 31 is a voltage of a frequency of 2.5 p.p.s. having incorporated therein a voltage $e_0$ of a certain value as a bias, as illustrated in FIGURE 2A. A pulse voltage $e_3$ produced at the output terminal 321 of the second and-gate circuit 32 is a depression voltage of a frequency of 2.5/60 p.p.s. having incorporated therein the voltage $e_0$ as a bias, as shown in FIGURE 2B. A pulse voltage $e_4$ appearing at the output terminal 331 of the or-gate circuit 33 is a voltage of a wave-form resulting from superposing the aforementioned pulse voltages $e_2$ and $e_3$, as depicted in FIGURE 2C.

In the driving circuit II reference numeral 4 indicates a pulse discriminator circuit, 41 and 42 constant-voltage elements referred to as Zener diodes and 43 and 44 resistor elements. A series circuit of the diode 41 and the resistor 43 and a series circuit of the resistor 44 and the diode 42 are connected in parallel to each other, both ends of the parallel circuit being connected between the output terminals 331 of the or-fate circuit 33 and the connecting terminal. The diodes 41 and 42 are those whose breakdown voltage is substantially equal to the bias voltage $e_0$ of the aforementioned pulse voltages $e_2$ and $e_3$. Accordingly, a voltage $e_5$ present between the connecting point 45 of the diode 41 and the resistor 43 and the ground terminal is a pulse voltage of 2.5 p.p.s. having not incorporated therein the bias voltage $e_0$ due to the clipper action, as shown in FIGURE 2D. A voltage $e_6$ appearing between the connecting point 46 of the resistor 44 and the diode 42 and the ground terminal becomes a pulse voltage of 2.5/60 p.p.s. due to the limiter action, as illustrated in FIGURE 2F. Reference numeral 5 identifies a change-over switch having its lower stationary contact 51 connected to the connecting point 45 of the aforementioned pulse discriminator circuit 4 and its upper stationary contact 52 connected to the connecting point 46. Reference numeral 6 designates a monostable multivibrator circuit consisting of, for example, two transistors 61 and 62. The monostable multivibrator circuit 6 is normally in the standard condition that the transistor 61 is in the off-state while the transistor 62 is in the on-state. Upon application of a shot of pulse voltage to the input end, the condition of the monostable multivibrator circuit 6 is reversed such that the transistor 61 is in the on-state while the transistor 62 is in the off-state. After a certain period of time depending upon the time constant of the circuit 6, the circuit 6 is restored to its standard condition. The input end 60 of the monostable multivibrator circuit 6 is connected to the movable contact piece 53 of the change-over switch 5. Reference numerals 71 and 72 indicate first and second amplifiers, and 8 a step motor. When the transistor 61 of the monostable multivibrator circuit 6 is put in the on-state, its output terminal voltage $e_{71}$ is amplified by the first amplifier 71 and is then fed to the step motor 8 to rotate it one step. When the transistor 62 returns to its on-state its output terminal voltage $e_{72}$ is amplified by the second amplifier 72 and is then applied to the step motor 8 to rotate it one step. Reference numeral 9 identifies an inverter circuit which reverses the polarity fo a voltage applied to its input end 90 and controls the output of the second amplifier 72. That is, if the second amplifier 72 produces an output $e_{82}$, it is reduced to zero while a voltage is applied to the input end 90 of the inverter circuit 9.

For convenience's sake in describing the operation of the driving circuit II, the time constant of the monostable multivibrator circuit 6 is selected to be 200 ms. in the illustrated example. Turning the movable contact piece 53 of the change-over switch 5 down to the lower stationary contact, the pulse voltage $e_5$ such as shown in FIGURE 2D is applied to the input end 60 of the monostable multivibrator circuit 6 maintained in the standard condition. By a first shot of the pulse voltage $e_5$ the transistor 61 is put in the on-state, while the transistor 62 is put in the off-state. Then, the output voltage $e_{71}$ of the transistor 61 is amplified by the first amplifier 71 and the amplified output $e_{81}$ is fed to the step motor 8 to rotate it one step. In this case, the first shot of the pulse voltage $e_5$ is also fed to the inverter circuit 9, but the output $e_{82}$ of the second amplifier 72 is zero at the moment when the first shot is applied to the inverter circuit 9, so that the inverter circuit 9 does not exert any influence upon the operation just described above. After the lapse of 200 ms. corresponding to the time constant of the monostable multivibrator circuit 6 following its reversal, the monostable multivibrator circuit 6 returns to its standard condition such that the transistor 61 is in the off-state and the transistor 62 is in the on-state. Then, the output voltage $e_{72}$ of the transistor 62 is amplified by the second amplifier 72 and the amplified output $e_{82}$ therefrom is fed to the step motor 8 to rotate it one step. Since the period of the pulse voltage $e_5$ is 400 ms. and no pulse is applied to the inverter circuit 9 for a period of time from 200 ms. to 400 ms. after the application of the first shot of the pulse, the inverter circuit 9 does not affect the aforementioned operation, even if the second amplifier 72 yields an output. After the lapse of 400 ms. following the first shot of the pulse, a second shot of the pulse is applied to the monostable multivibrator circuit 6 to repeat the aforementioned operation. The operation of the monostable multivibrator circuit 6 is diagramatically illustrated in FIGURE 2E.

When the movable contact piece 53 of the change-over switch 5 is turned into contact with the upper stationary contact 52, a pulse voltage $e_6$ such as shown in FIGURE 2F is applied to the monostable multivibrator circuit 6. Upon application of the depression pulse the transistor 61 is put in the on-state and the transistor 62 is put in the off-state. The output voltage $e_{71}$ of the transistor 61 is amplified by the first amplifier 71 and the amplified voltage $e_{81}$ is fed to the step motor 8 to rotate it one step. At this time, since the value of the voltage applied to the input end of the inverter circuit 9 is zero, the inverter circuit does not exert any influence upon the operation described just above. After 200 ms. corresponding the time constant of the monostable multivibrator 6 following its reversal, the circuit 6 returns to its standard condition. Namely, the output voltage $e_{72}$ of the transistor 62 in the on-state is amplified by the second amplifier 72, by the amplified voltage $e_{82}$ of which the step motor 8 is further driven one step. The pulse width of the depression pulse is 400 ms. and the value of the voltage $e_6$ to the inverter circuit 9 is zero during a time from 200 ms. to 400 ms. after the monostable multivibrator circuit 6 has been reversed by the depression pulse, so that the inverter circuit 9 does not affect the aforementioned operation. At a time of 400 ms. after the reversal of the monostable multivibrator circuit 6, the value of the voltage $e_6$ becomes $e_0$ and consequently the inverter circuit 9 immediately reverses the polarity of the voltage $e_0$, by the output of which the value of the output $e_{82}$ of the second amplifier 72 is reduced to zero. As a result of this, the step motor 8 stops rotating until the application of the next depression pulse, (namely until a time of 400 ms.$\times 60=24$ s. after the reversal of the circuit 6). In this case, however, a small amount of current is fed to the step motor 8 in practice, since it cannot be held at its standstill position when completely no current is applied thereto.

In the illustrated example, the first frequency divider 21 demultiples the output frequency 300 p.p.s. of the reference pulse generated 1 into $\frac{1}{120}$ thereof and the first and-gate circuit 31 produces at its output end the pulse voltage $e_2$ of a frequency 2.5 p.p.s. having incorporated therein the bias voltage of a certain value. The second frequency divider 22 further demultiplies the output frequency of the first frequency divider 21 into $\frac{1}{60}$ thereof and the second and-gate circuit 32 produces at its output end the depression pulse voltage $e_3$ of a frequency $^{2.5}\!/_{60}$ p.p.s. having incorporated therein a bias voltage of the same value as that of the aforementioned bias voltage $e_0$. As a result of this, the or-gate circuit 33 yields at its output end the pulse voltage $e_4$ that the aforementioned pulse voltages $e_2$ and $e_3$ are superposed. The pulse discriminator circuit 4 discriminates between the pulse voltage of 2.5 p.p.s. and that of $^{2.5}\!/_{60}$ p.p.s. contained in the pulse voltage $e_4$. Then, the discriminated pulse voltages are separately fed through the change-over switch 5 to the monostable multivibrator circuit 6 consisting of, for example, two transistors, actuating it at a frequency of 2.5 p.p.s. or $^{2.5}\!/_{60}$ p.p.s. The first amplifiers 71 and 72 separately amplify and energize the output voltages of the transistors of the monostable multivibrator circuit 6, and the step motor 8 is rotated step by step by the outputs of the amplifiers 71 and 72 alternately. Further, the inverter circuit 9 receives the same voltage as the pulse voltage applied to the monostable multivibrator circuit 6, and when the voltage is of a certain value and the second amplifier 72 yields an output the inverter circuit 9 controls the output of the amplifier to be zero. Accordingly, if the change-over switch 5 is connected so that the pulse voltage of 2.5 p.p.s. is fed to the monostable multivibrator circuit 6, the step motor 8 is driven two steps at every period of 40 ms. Where the change-over switch 5 is so connected as to apply the pulse voltage of $^{2.5}\!/_{60}$ to the circuit 6, the step motor 8 is driven two steps at every period which is 60 times as long as that in the case of 2.5 p.p.s.

While this invention has been described in connection with the case where the output frequency of the reference pulse generator 1 is converted into pulse signals of two kinds of frequencies, it is possible to convert the output frequency of the reference pulse generator 1 into more than three kinds of frequencies. In addition, the pulse signals of the two kinds of frequencies are such signals each having a bias of the same value, but the biases of the two signals may be different from each other, and in this case the values of the constant-voltage elements 41 and 42 of the pulse discriminator circuit 4 are selected in accordance with the biases. Furthermore, the time constant of the monostable multivibrator circuit 6 is selected to be ½ of the period of the pulse signal having a high frequency, but this time constant is sufficient to be less than ½.

According to this invention, since the output frequency of the reference pulse generator is converted into signals of more than two kinds of frequencies and these converted pulse signals are applied to the following stages after superposed, their transmission line may be single. Namely, the circuit structure is simple, although various pulses are produced. Further, the aforementioned pulse signals are those each having a bias and the pulses are discriminated by utilizing the biases, so that the pulse discriminator circuit is simplified in structure. Moreover, the pulse signals obtained by discrimination are fed to the monostable multivibrator circuit and the inverter circuit and the output of the monostable multivibrator circuit to be fed to the step motor is controlled by utilizing the inverter circuit. This enables limiting the time of the driving current flowing to the step motor to reduce power consumption. Therefore, the present invention is of particular utility when employed in, for example, a record sheet feeding device driven at various speeds.

It will be apparent that many modifications and variations may be effected without departing from the scope of the novel concepts of this invention.

What we claim is:
1. A driving device for step motors comprising a reference pulse generator producing a pulse of a certain constant frequency, circuit means for converting the output pulse of the reference pulse generator into pulse signals of more than two kinds of frequencies each having incorporated therein a bias, a circuit for superposing the pulse signals of more than two kinds of frequencies, a pulse discriminator circuit for discriminating the superposed pulse signal into the pulse signals of more than two kinds of frequencies by utilizing the biases, a monostable multivibrator circuit, a change-over switch for separately feeding the discriminated pulse signals to the monostable multivibrator circuit, and a step motor driven by two output signals produced in accordance with the condition of the monostable multivibrator circuit.

2. A driving device for step motors comprising a reference pulse generator producing a pulse of a certain constant frequency, circuit means for converting the output pulse of the reference pulse generator into pulse signals of more than two kinds of frequencies each having incorporated therein a bias, a circuit for superposing the pulse signals of more than two kinds of frequencies, a pulse discriminator circuit for discriminating the superposed pulse signal into the pulse signals of more than two kinds of frequencies, a monostable multivibrator circuit, a change-over switch for separately feeding the discriminated pulse signals to the monostable multivibrator circuit, a step motor driven by two output signals produced in accordance with the condition of the monostable multivibrator, and an inverter circuit receiving the same signal as that fed to the monostable multivibrator circuit and controlling one of the outputs of the monostable multivibrator circuit.

References Cited

UNITED STATES PATENTS

| | | |
|---|---|---|
| 3,015,806 | 1/1962 | Wang et al. |
| 3,146,386 | 8/1964 | Gerber et al. _____ 310—49 XR |
| 3,184,663 | 5/1965 | Mergler _____ 310—49 XR |

ORIS L. RADER, *Primary Examiner.*

G. R. SIMMONS, *Assistant Examiner.*

U.S. Cl. X.R.

318—341